(12) United States Patent
Amemiya

(10) Patent No.: US 11,487,280 B2
(45) Date of Patent: Nov. 1, 2022

(54) DETERMINATION DEVICE AND DETERMINATION METHOD

(71) Applicant: FUJITSU LIMITED, Kawasaki (JP)

(72) Inventor: Satoshi Amemiya, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 448 days.

(21) Appl. No.: 16/689,229

(22) Filed: Nov. 20, 2019

(65) Prior Publication Data

US 2020/0089209 A1 Mar. 19, 2020

Related U.S. Application Data

(63) Continuation of application No. PCT/JP2017/020581, filed on Jun. 2, 2017.

(51) Int. Cl.
*G05B 23/02* (2006.01)
*B25J 9/16* (2006.01)
*B25J 13/08* (2006.01)

(52) U.S. Cl.
CPC ........ *G05B 23/0286* (2013.01); *B25J 9/1697* (2013.01); *B25J 13/087* (2013.01)

(58) Field of Classification Search
CPC ............. G05B 23/0286; G05B 23/0281; B25J 9/1697; B25J 13/087; B25J 9/1674; G01M 99/00
USPC .................. 700/245–264; 318/568.11–568.25
See application file for complete search history.

(56) References Cited

U.S. PATENT DOCUMENTS

| | | | | |
|---|---|---|---|---|
| 4,495,588 A * | 1/1985 | Nio | ........................... | B25J 9/161 901/3 |
| 5,475,797 A * | 12/1995 | Glaspy, Jr. | ........ | G05B 19/41805 318/568.25 |
| 6,035,243 A * | 3/2000 | Galuga | ............ | G05B 19/41805 700/110 |
| 6,151,582 A * | 11/2000 | Huang | ............... | G06Q 10/0637 705/7.31 |
| 6,466,844 B1 * | 10/2002 | Ikeda | ..................... | B25J 9/1682 318/568.14 |

(Continued)

FOREIGN PATENT DOCUMENTS

| CN | 102326065 A | 1/2012 |
|---|---|---|
| CN | 102844721 A | 12/2012 |

(Continued)

OTHER PUBLICATIONS

Chinese Office Action dated Jan. 4, 2021 for corresponding Chinese Patent Application No. 201780091249.X, with English Translation, 16 pages.

(Continued)

*Primary Examiner* — Jaime Figueroa
(74) *Attorney, Agent, or Firm* — Fujitsu Patent Center

(57) ABSTRACT

A determination device includes: a memory; and a processor coupled to the memory and configured to: obtain sensor data on motion of a device from a plurality of sensors, extract, from the sensor data, data related to an anomaly based on a threshold value used in detecting the anomaly with use of the sensor data, convert the data related to the anomaly into structural data having a graph structure focusing on an analogous relationship between or among the plurality of sensors, and generate a classifier that identifies a cause of the anomaly with use of the structural data.

15 Claims, 10 Drawing Sheets

(56) References Cited

U.S. PATENT DOCUMENTS

| | | | | |
|---|---|---|---|---|
| 7,716,011 | B2* | 5/2010 | Thibaux | G06K 9/00536 |
| | | | | 702/179 |
| 8,229,586 | B2* | 7/2012 | Wallace | G05B 19/41805 |
| | | | | 700/114 |
| 8,712,589 | B2* | 4/2014 | Nagata | G05B 19/401 |
| | | | | 700/250 |
| 8,798,790 | B2* | 8/2014 | Kamiya | G05B 19/401 |
| | | | | 318/567 |
| 9,053,222 | B2* | 6/2015 | Lynn | G16H 50/20 |
| 9,122,273 | B2* | 9/2015 | Uchiyama | G05B 23/0221 |
| 9,699,049 | B2* | 7/2017 | Gupta | H04L 41/147 |
| 10,223,403 | B2* | 3/2019 | Malhotra | G06K 9/6284 |
| 10,747,188 | B2* | 8/2020 | Yoshida | G05B 23/0243 |
| 2006/0184264 | A1* | 8/2006 | Willis | G05B 19/4184 |
| | | | | 700/110 |
| 2006/0276934 | A1* | 12/2006 | Nihei | B25J 9/1679 |
| | | | | 700/245 |
| 2007/0028220 | A1* | 2/2007 | Miller | G05B 23/0278 |
| | | | | 717/124 |
| 2008/0015726 | A1* | 1/2008 | Harvey | G05B 23/0281 |
| | | | | 700/110 |
| 2008/0208526 | A1* | 8/2008 | Thibaux | G06K 9/00536 |
| | | | | 702/176 |
| 2010/0174444 | A1* | 7/2010 | Hansson | G06Q 10/06 |
| | | | | 703/2 |
| 2010/0214069 | A1* | 8/2010 | Kong | G06K 7/10009 |
| | | | | 340/10.1 |
| 2011/0270443 | A1* | 11/2011 | Kamiya | G05B 19/401 |
| | | | | 901/46 |
| 2011/0270444 | A1* | 11/2011 | Nagata | G05B 19/401 |
| | | | | 901/46 |
| 2012/0041663 | A1 | 2/2012 | Suzuki et al. | |
| 2012/0310597 | A1 | 12/2012 | Uchiyama et al. | |
| 2013/0060524 | A1* | 3/2013 | Liao | G05B 23/0254 |
| | | | | 702/182 |
| 2013/0173218 | A1 | 7/2013 | Maeda et al. | |
| 2016/0088006 | A1* | 3/2016 | Gupta | H04L 43/08 |
| | | | | 706/12 |
| 2016/0210556 | A1* | 7/2016 | Ben Simhon | G06N 20/00 |
| 2016/0284357 | A1 | 9/2016 | Kawashima et al. | |
| 2016/0299938 | A1* | 10/2016 | Malhotra | G06N 3/0445 |
| 2019/0130659 | A1* | 5/2019 | Ide | G07C 5/006 |

FOREIGN PATENT DOCUMENTS

| | | |
|---|---|---|
| JP | 2010-78467 A | 4/2010 |
| JP | 2012-18623 A | 1/2012 |
| JP | 2012-58890 A | 3/2012 |
| JP | 2016-14961 A | 1/2016 |
| WO | 2015/129165 A1 | 9/2015 |

OTHER PUBLICATIONS

Chinese Office Action dated Apr. 21, 2021 for corresponding Chinese Patent Application No. 201780091249.X, with English Translation, 15 pages. *Please note CN-102844721-A, CN-102326065-A, US-2012-0310597-A1, US-2012-0041663-A1, cited herewith, were previously cited in an IDS filed on Feb. 2, 2021*.

Ide, Tsuyoshi, "Change-point Detection and Failure Analysis of Sensor Data Using Sparse Structure Learning", IBM Professionals' Papers, Provision, No. 65, 2010, pp. 71-76, with English Abstract.

Hirose, Shunsuke et al., "Anomaly Detection based on Doubly-Kernelized Scoring and Matrix Kernels", Feature Papers on the 30th Anniversary of the Japanese Society for Artificial Intelligence, vol. 31, Issue 6, AI30-D, 2016, pp. 1-15, with English Abstract.

Ide, Tsuyoshi et al., "Proximity-Based Anomaly Detection using Sparse Structure Learning", Proceedings of the 2009 SIAM International Conference on Data Mining, 2009, pp. 97-108.

Friedman, Jerome et al., "Sparse inverse covariance estimation with the graphical lasso", Biostatics, vol. 9, Issue 3, Dec. 12, 2007, pp. 432-441.

International Search Report and Written Opinion of the International Searching Authority, with English Translation Form PCT/ISA/210, 220, and 237), mailed in connection with PCT Application No. PCT/JP2017/020581 dated Aug. 22, 2017.

* cited by examiner

DETERMINATION DEVICE AND DETERMINATION METHOD

CROSS-REFERENCE TO RELATED APPLICATION

This application is a continuation application of International Application No. PCT/JP2017/020581 filed on Jun. 2, 2017 and designated the U.S., the entire contents of which are incorporated herein by reference.

FIELD

A certain aspect of embodiments described herein relates to a determination device, a determination method, and a non-transitory computer-readable medium.

BACKGROUND

In production sites around the world, automatization and labor-saving are promoted mainly by introducing industrial robots, thereby reducing costs and improving production efficiency. Industrial robots themselves have been introduced to production sites for decades. However, the industrial robots have simply been able to repeat taught actions, and thus, were unable to flexibly respond to product changes. In addition, since there was a possibility that the industrial robots were unable to respond the change and thereby, produced a large amount of defective products, it was necessary for workers to keep adjusting robots.

In recent years, research and development of intelligent automated lines in which robots autonomously make judgments and take actions have been actively conducted using machine learning technology, which is one field of artificial intelligence. Moreover, to realize autonomous determination of production facilities, a technique for accurately detecting a work anomaly is known as disclosed, for example, Japanese Patent Application Publication No. 2010-78467.

SUMMARY

According to an aspect of the present invention, there is provided a determination device including: a memory; and a processor coupled to the memory and configured to: obtain sensor data on motion of a device from a plurality of sensors, extract, from the sensor data, data related to an anomaly based on a threshold value used in detecting the anomaly with use of the sensor data, convert the data related to the anomaly into structural data having a graph structure focusing on an analogous relationship between or among the plurality of sensors, and generate a classifier that identifies a cause of the anomaly with use of the structural data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

To achieve autonomous determination by the production robot, it is required to stop the production robot as rapidly as possible before components or the like are damaged when a work anomaly is detected. On the other hand, it is preferable to obtain detailed sensor data to analyze and estimate the cause of the work anomaly. However, when the production robot is stopped immediately after the detection of the anomaly, the sensor data cannot be obtained thereafter. Thus, it becomes difficult to estimate the cause of the anomaly.

Other robots and devices also have the same or similar problem as well as production robots.

First Embodiment

Hereinafter, a first embodiment will be described in detail based on FIG. 1 through FIG. 9.

Figure 1:
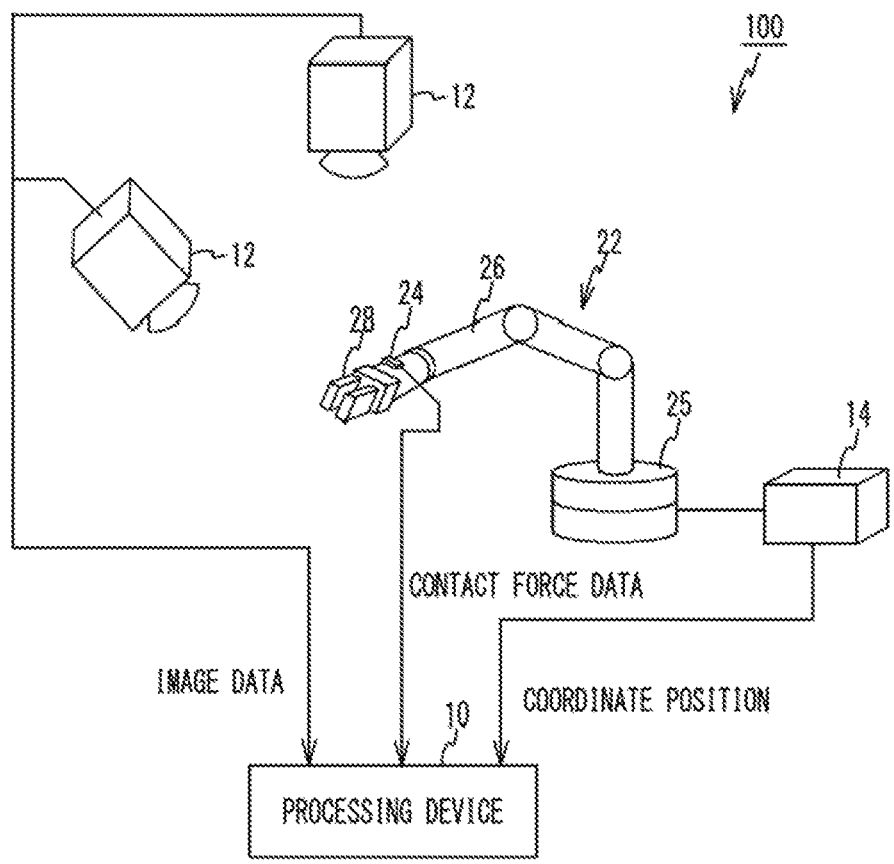
FIG. 1 is a diagram for describing an overall structure of a work apparatus in accordance with a first embodiment.

FIG. 1 is a diagram for describing an overall structure of a work apparatus 100 in accordance with a first embodiment. As illustrated in FIG. 1, the work apparatus 100 includes a robot 22, a controller 14, a camera 12, and a processing device 10.

The robot 22 is, for example, an industrial robot. The robot 22 includes, for example, a stage 25 and a manipulator 26. The manipulator 26 carries out a task with use of an action part 28. Examples of the task carried out by the manipulator 26 includes picking a component to be mounted on a printed-circuit board, delivering the component above the printed-circuit board, and mounting the component on the printed-circuit board. The action part 28 is, for example, a hand mechanism. The stage 25 supports the manipulator 26. The robot 22 is controlled by the controller 14. The controller 14 operates the robot 22 based on time-series teaching data stream of a series of tasks. The teaching data stream may be obtained from an external device through an input-output interface 97 illustrated in FIG. 3, or may be stored in an HDD 96 or the like in advance, for example.

Figure 2:
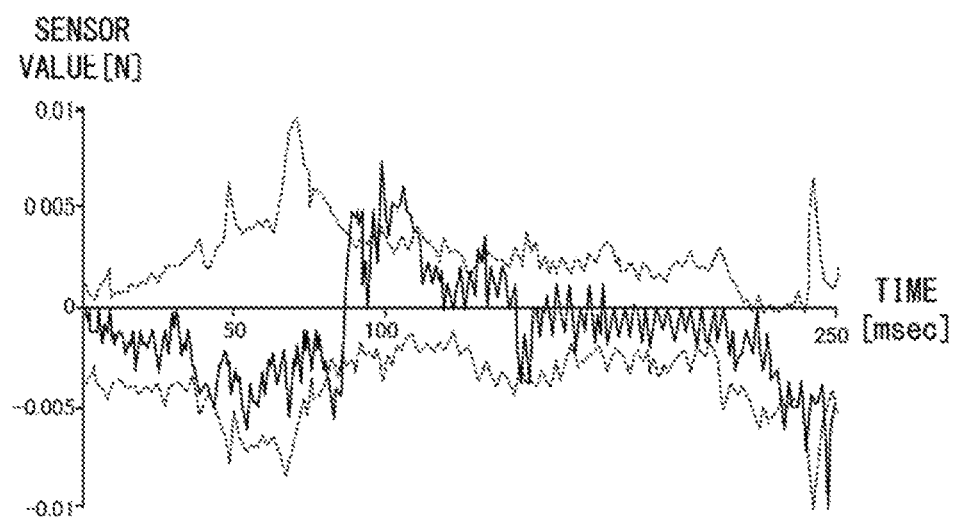
FIG. 2 illustrates change in the output value of a sensor.

A sensor 24 is provided to the manipulator 26, and detects the statuses of tasks carried out by the robot 22. For example, a strain sensor detecting the strain of the manipulator 26, a triaxial or hexaxial force sensor, a load sensor, a pressure sensor, an acceleration sensor, and a microphone may be used as the sensor 24. It is assumed that a plurality of the sensors 24 is provided to the manipulator 26. When the triaxial or hexaxial force sensor is used as the sensor 24, the force vector and/or the torque at the point of load can be detected. FIG. 2 illustrates change in the output value of the sensor 24. In FIG. 2, the horizontal axis represents an elapsed time (clock time) from the time of commencement of a task by the robot 22, and the vertical axis represents the output value (the sensor value) of the sensor 24. As illustrated in FIG. 2, while the robot 22 carries out a series of motions, the output value of the sensor 24 (the waveform indicated by a solid line) changes. In FIG. 2, the range vertically sandwiched between dashed lines indicate the threshold value used in the anomaly determination described later.

Referring back to FIG. 1, the camera 12 is a two-dimensional image sensor such as a charge coupled device (CCD) sensor or a complementary metal oxide semiconductor (CMOS) sensor. However, the camera 12 is not limited to the above example, and may be a one-dimensional image sensor.

The processing device 10 determines whether the status of the task by the robot 22 is good (whether the status of the task by the robot 22 is normal or abnormal) based on the image data obtained by the camera 12, the data detected by the sensor 24, and the coordinate positions of the action part 28. When determining that the status of the task is abnormal, the processing device 10 identifies the cause of the anomaly. In the following descriptions, for the convenience sake, various data including the image data obtained by the camera 12, the data detected by the sensor 24, and the coordinate positions of the action part 28 will be referred to as "sensor data".

Figure 3:
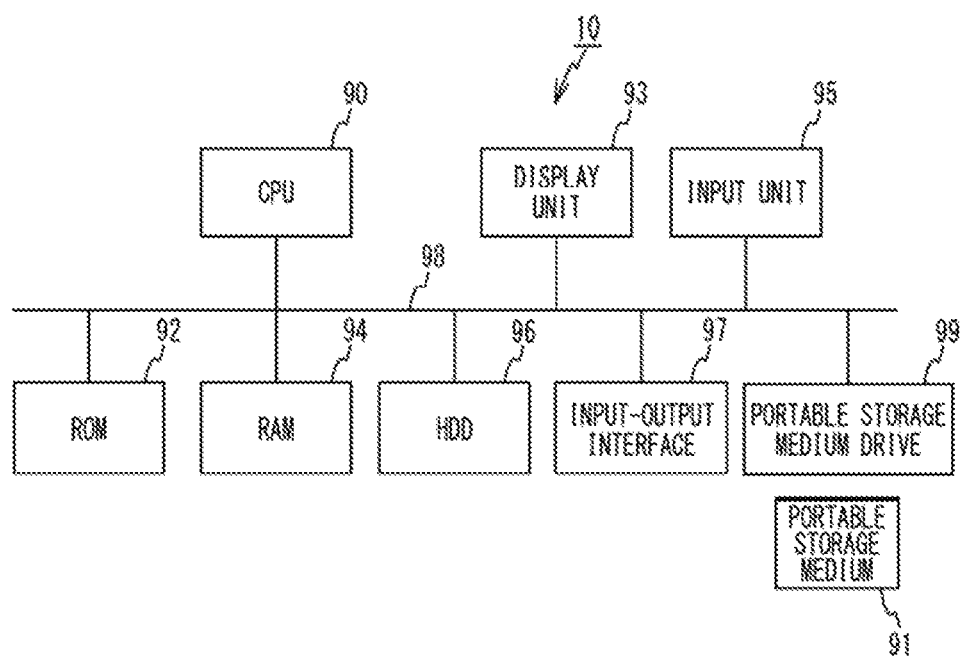
FIG. 3 illustrates a hardware configuration of a processing device.

FIG. 3 illustrates a hardware configuration of the processing device 10. As illustrated in FIG. 3, the processing device 10 includes a central processing unit (CPU) 90, a read only memory (ROM) 92, a random access memory (RAM) 94, a storage unit (here, a hard disk drive (HDD)) 96, the input-output interface 97, a display unit 93, an input unit 95, and a portable storage medium drive 99. These components of the processing device 10 are coupled to a bus 98. The display unit 93 includes a liquid crystal display, and the input unit 95 includes a keyboard, a mouse, and an input button. In the processing device 10, functions of each unit illustrated in FIG. 4 are implemented by the CPU 90 executing programs (including a determination program) stored in the ROM 92 or the HDD 96 or programs (including the determination program) read from a portable storage medium 91 by the portable storage medium drive 99.

Figure 4:
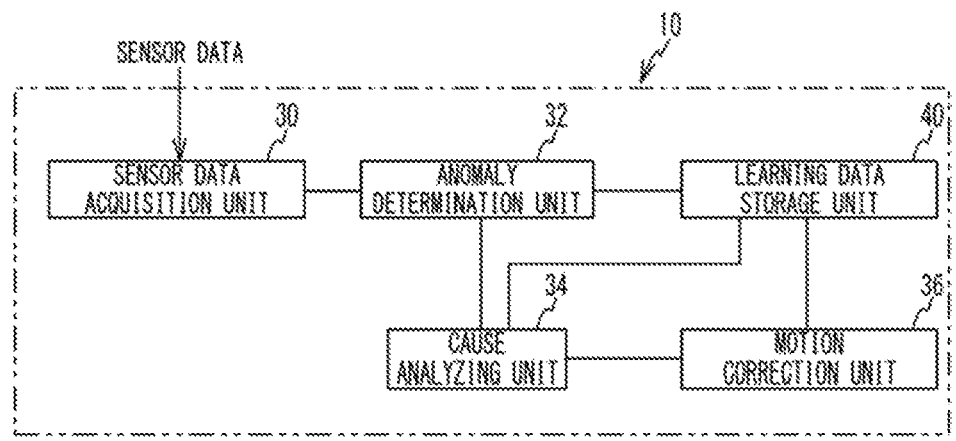
FIG. 4 is a functional block diagram of the processing device.

FIG. 4 is a functional block diagram of the processing device 10. The execution of the program by the CPU 90 causes the processing device 10 to function as a sensor data acquisition unit 30, an anomaly determination unit 32 as an anomaly detection execution unit, a cause analyzing unit 34 as an anomaly cause identification unit, and a motion correction unit 36. A learning data storage unit 40 illustrated in FIG. 4 is implemented by the HDD 96 or the like. The learning data storage unit 40 stores various data described later.

The sensor data acquisition unit 30 acquires sensor data (the image data obtained by the camera 12, the data detected by the sensor 24, the coordinate positions of the action part 28, and the like), and transmits the acquired sensor data to the anomaly determination unit 32.

The anomaly determination unit 32 determines whether an anomaly occurs by using the sensor data received from the sensor data acquisition unit 30. Specifically, the anomaly determination unit 32 determines whether an anomaly occurs by using an anomaly detection classifier obtained from anomaly detection classifier information stored in the learning data storage unit 40. In advance, the anomaly determination unit 32 generates the anomaly detection classifier information by using part of learning data (referred to as training data) stored in the learning data storage unit 40, and stores the generated anomaly detection classifier information in the learning data storage unit 40.

The cause analyzing unit 34 analyzes the cause of an anomaly based on the sensor data with which the anomaly determination unit 32 determined that the anomaly occurred. Specifically, the cause analyzing unit 34 conducts a causal analysis by using an anomaly cause classifier obtained from anomaly cause classifier information stored in the learning data storage unit 40. In advance, the cause analyzing unit 34 generates the anomaly cause classifier information by using part of the learning data (referred to as test data) stored in the learning data storage unit 40, and stores the generated anomaly cause classifier information in the learning data storage unit 40. The cause of an anomaly includes a fitting position misalignment x-direction anomaly and a pin damage anomaly. The fitting position misalignment x-direction anomaly means an anomaly that occurs due to misalignment in the x-direction between a hole formed in a printed-circuit board and a pin provided to a component. The pin damage anomaly means an anomaly due to the damage (flexion or the like) of a pin provided to a component. These anomalies are classified based on means or measures necessary to eliminate the anomaly. In the present embodiment, each anomaly is classified as an anomaly that requires the robot 22 to be stopped, an anomaly that requires the robot 22 to re-execute (retry) the motion, or an anomaly that requires to correct the motion of the robot 22.

When the result of the analysis by the cause analyzing unit 34 reveals that the cause of the anomaly is a cause that can be eliminated by the correction, the motion correction unit 36 corrects the motion of the robot 22.

The learning data storage unit 40 stores data that the anomaly determination unit 32 uses for the anomaly determination and data that the cause analyzing unit 34 uses for the cause analysis. For example, the learning data storage unit 40 stores the training data used by the anomaly determination unit 32 and the test data used by the cause analyzing unit 34. The learning data storage unit 40 also stores the anomaly detection classifier information used by the anomaly determination unit 32 and the anomaly cause classifier information used by the cause analyzing unit 34.

Next, processes executed by the processing device 10 will be described in detail with reference to flowcharts of FIG. 5 and FIG. 6.

(Advance Preparation Phase)

Figure 5:
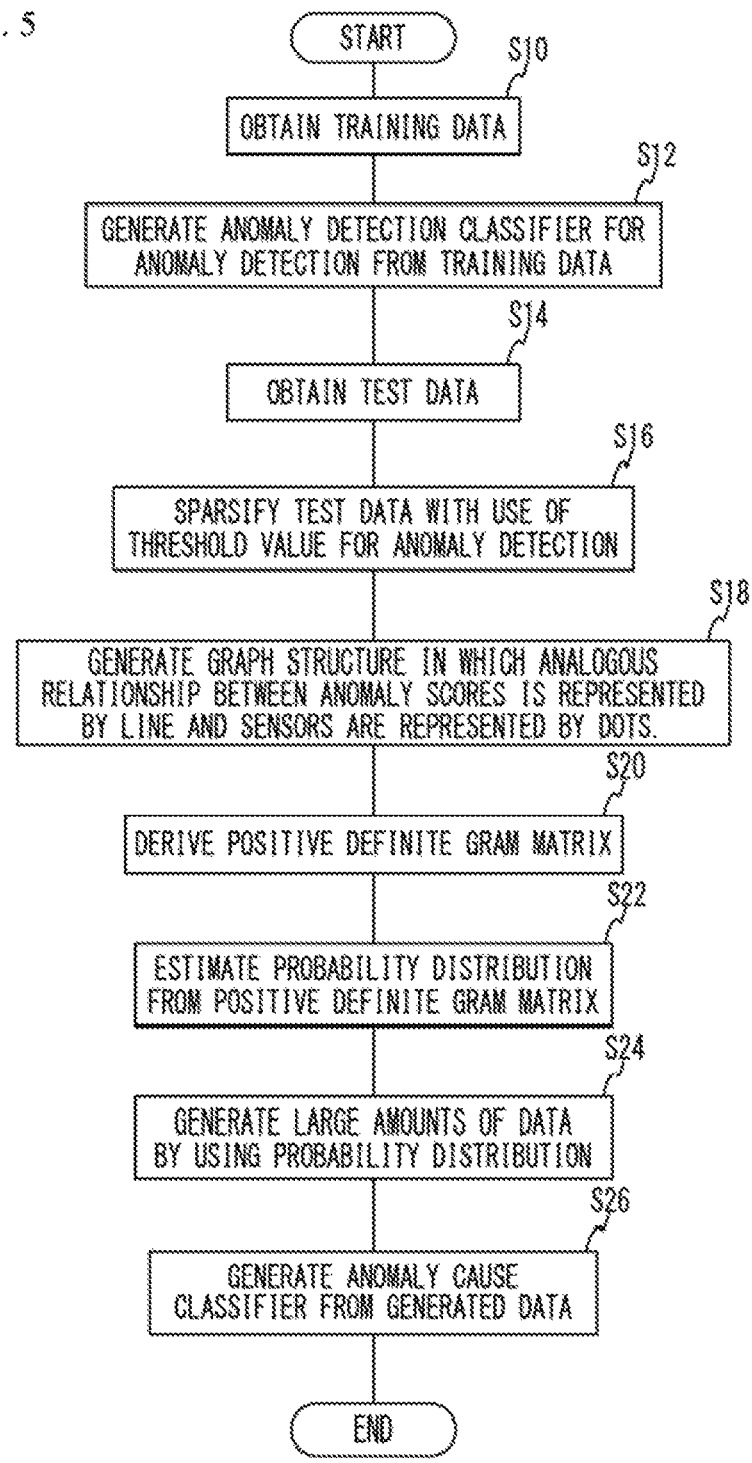
FIG. 5 is a flowchart of a process executed by the processing device in an advance preparation phase.

FIG. 5 is a flowchart of a process executed by the processing device 10 in an advance preparation phase.

Here, in the present embodiment, as described above, the learning data storage unit 40 stores two kinds of data (the training data and the test data) as the learning data. The training data is data used to generate the anomaly detection classifier information, and the test data is data used to generate the anomaly cause classifier information.

In step S10 of FIG. 5, the anomaly determination unit 32 obtains the training data from the learning data storage unit 40.

Then, in step S12, the anomaly determination unit 32 generates, from the training data, the anomaly detection classifier for anomaly detection. Specifically, the anomaly determination unit 32 calculates, based on the training data, a threshold value for the anomaly detection as indicated by dashed lines in FIG. 2. The threshold value is calculated with respect to each sensor or each sensor group. The anomaly determination unit 32 generates the anomaly detection classifier based on the information on the threshold value. The anomaly determination unit 32 stores, in the learning data storage unit 40, the information on the calculated threshold value as the anomaly detection classifier information. Various algorithms can be used as an anomaly detection algorithm. However, the algorithm is an algorithm that can obtain the anomaly score value (or the abnormal value) of each sensor by using the threshold value of the anomaly detection algorithm.

Figure 7A:
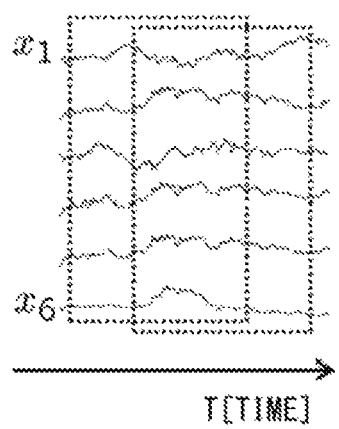
FIG. 7A through FIG. 7C are diagrams for describing the processes in FIG. 5 and FIG. 6.

Then, in step S14, the cause analyzing unit 34 obtains the test data from the learning data storage unit 40. For example, test data $x_1, \ldots, x_6$ illustrated in FIG. 7A is obtained. Here, "i" represents the sensor number, and $x_i$ represents the test data of a sensor i.

Then, in step S16, the cause analyzing unit 34 sparsifies the test data by using the threshold value for the anomaly detection. The sparsification allows only the data related to anomalies to be extracted. Specifically, the cause analyzing unit 34 sequentially inputs the test data to the anomaly detection classifier to obtain the anomaly score values. Then, the cause analyzing unit 34 sparsifies the obtained anomaly score values by the threshold value used in the anomaly detection. Here, the most natural sparsification of the sensor data is expressed in the following equation (1) where the anomaly score after the sparsification is represented by $s_i$, and the threshold value is represented by $th_i$.

[Formula 1]

$$s_i = \begin{cases} a_i(x_i) - th_i & (a_i(x_i) > th_i) \\ 0 & (a_i(x_i) \leq th_i) \end{cases} \quad (1)$$

When it is assumed that $a_i(x_i)$ means the anomaly score value and D is the learning data in the sensor i, $a_i(x_i)$ is expressed in the following equation (2).

[Formula 2]

$$a_i(x_i) = \ln p(x_i|D) \quad (2)$$

Figure 7B:
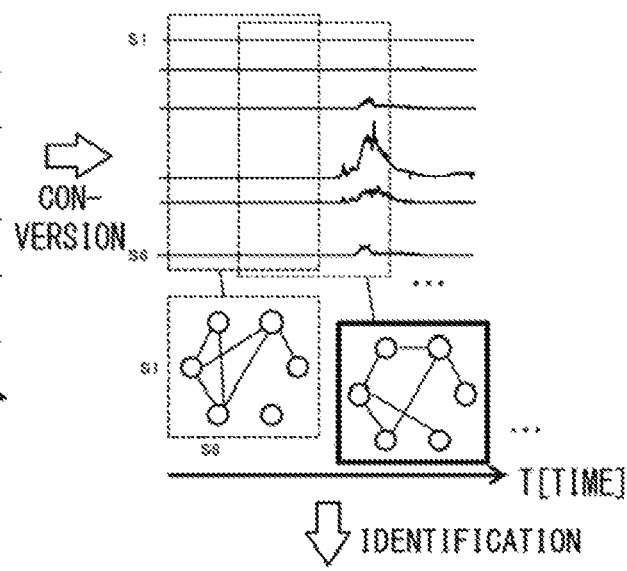
Figure 8A:
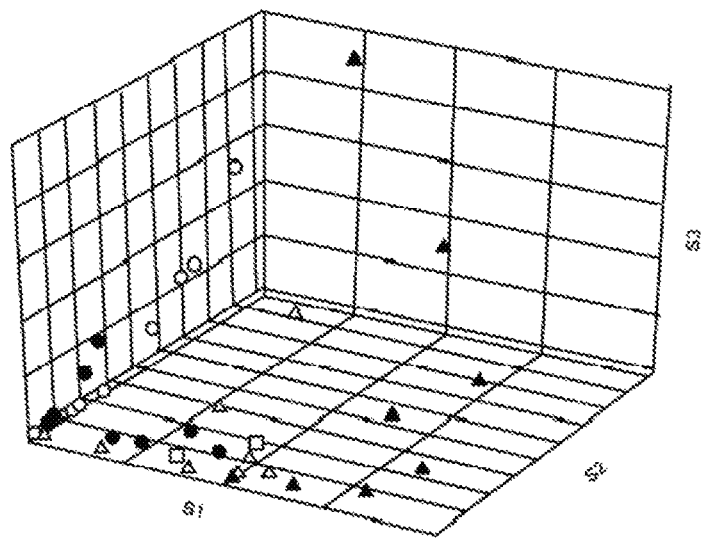
FIG. 8A illustrates sparsified sensor data.

The upper part of FIG. 7B illustrates sparsified sensor data $s_i$. The sparsified sensor data is time-series data as well as the original data (data in FIG. 7A). Thus, it is necessary to convert the sparsified sensor data to a representative value of some kind. Here, a certain window width (see the dashed line frame in the upper part of FIG. 7B) is set, and the average value of data within the window width is set as the representative value. The above described process is executed for each sensor and all test data to prepare a dataset for creating the anomaly cause classifier. FIG. 8A illustrates sparsified sensor data (data related to anomalies). FIG. 8A presents the relationship among the sparsified sensor data of sensors 1 through 3 in a three-dimensional coordinate. In FIG. 8A, points having the same shape means data (after sparsification) obtained when the anomaly due to the same cause occurred.

Then, in step S18, the cause analyzing unit 34 generates a graph structure in which the analogous relationship between anomaly scores is represented by a line, and the sensors are represented by dots. The lower part of FIG. 7B illustrates a graph structure.

Here, techniques such as L1 regularization (Lasso) are not used, and the Gram matrix, which is a general expression of a variance-covariance matrix (precision matrix), is used for structuring to allow the embodiment to be applied to complex models that cannot be calculated using the maximum likelihood estimation method. The Gram matrix K is expressed in the following equation (3). Here, k is a constant.

[Formula 3]

$$K = \begin{pmatrix} k(x_1, x_1) & \cdots & k(x_N, x_1) \\ \vdots & \ddots & \vdots \\ k(x_1, x_N) & \cdots & k(x_N, x_N) \end{pmatrix} \quad (3)$$

K is created with respect to each anomaly mode p.

The matrix element is expressed in the following equation (4). Here, $\langle \ \rangle$ is a symbol of inner product, and is in the Hilbert space.

[Formula 4]

$$k(x_i, x_j) = \langle x_i, x_j \rangle_H \quad (4)$$

The matrix element of this Gram matrix is referred to as a positive-semidefinite kernel. The positive-semidefinite kernel is based on the Hilbert space, and therefore, meets three conditions (axiom of inner product) presented in the following (5).

[Formula 5]

(a) Symmetric property: $k(x_i, x_j) = k(x_j, x_i)$ (b) Positive-semidefinite property: $k(x_i, x_j) \geq 0$ (c) Linearity: $k(\alpha x_i + \beta y_i, x_j) = \alpha k(x_i, x_j) + \beta k(y_i, x_j)$ (5)

In the present technique, properties (a) and (b) are important. Based on the property (a), the Gram matrix is a symmetric matrix, and based on the property (b), the Gram matrix has a positive-semidefinite property. The symmetric matrix is useful, but the positive-semidefinite property becomes a problem when a probabilistic model is generated with use of the Gram matrix. That is, a case where the eigenvalue is 0 is also assumed, and the Gram matrix becomes a singular matrix when the eigenvalue is 0, and the probabilistic model converges to the origin. Therefore, the eigenvalue decomposition is conducted to extract only the eigenvalues greater than 0 and the eigenvectors, and re-structure (conducts dimensional compression of) the diagonal matrix obtained by matrixing the eigenvalues greater than 0 and the orthogonal matrix in which the eigenvectors corresponding to the selected eigenvalue are arranged.

Thus, in next step S20, the cause analyzing unit 34 derives a positive definite Gram matrix. In this case, the cause analyzing unit 34 convers a Gram matrix to a positive definite Gram matrix by spectral decomposing the Gram matrix by the following formula (6). A Gaussian kernel can be used as a kernel.

[Formula 6]

$$\tilde{K} = \tilde{Y} \tilde{\Lambda} \tilde{Y}^T \quad (6)$$

Here, $\tilde{K}$ represents a positive definite Gram matrix, $\tilde{Y}$ represents an orthogonal matrix, and $\tilde{\Lambda}$ represents a diagonal matrix.

Then, in step S22, the cause analyzing unit 34 estimates the probability distribution from the positive definite Gram matrix. Here, a kernel density estimation is considered as a probabilistic model obtained from the positive definite Gram matrix, and is expressed in the following equation (7).

[Formula 7]

$$p_H(x \mid \tilde{K}) = \frac{1}{N} \sum_{k=1}^{N} |H|^{-\frac{1}{2}} \tilde{K}\left(H^{-\frac{1}{2}}(x - x_i)\right) \quad (7)$$

Wherein, $p_H(x \mid \tilde{K})$ represents a kernel density estimation, H represents a bandwidth matrix, and N represents the number of learning data.

The kernel density estimation is a non-parametric probability density estimation approach, and is considered as a dilatation that overcomes the discontinuity of the histogram density estimation. Unlike the parametric model such as a normal distribution, the advantage of the kernel density estimation is a very high expression ability for estimating a model from the data distribution, and is able to handle the population distribution different from the normal distribution (of course, it can be also used when the population is the normal distribution).

Figure 8B:
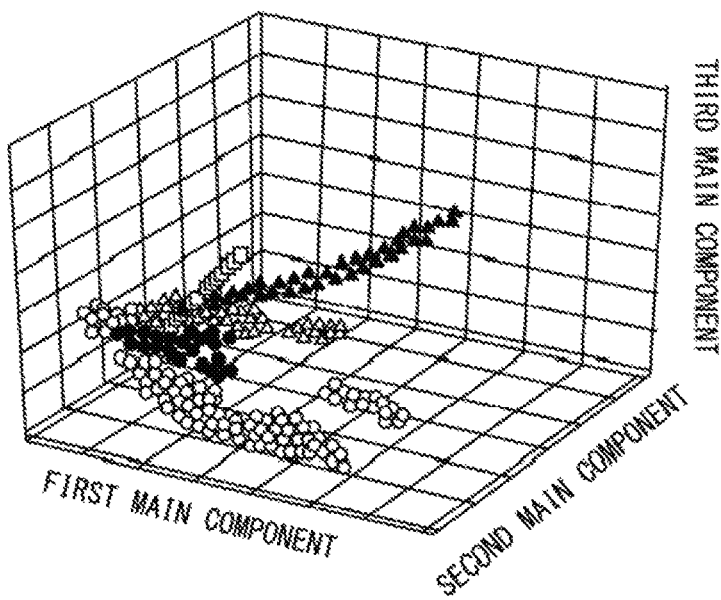
FIG. 8B illustrates a large amount of data generated with respect to each anomaly mode.

Then, in step S24, the cause analyzing unit 34 generates large amounts of data by using the probability distribution. In this case, a large amount of data is generated with respect to each anomaly mode by using the kernel density estimation expressed by the above equation (7). FIG. 8B illustrates large amounts of data generated with respect to each anomaly mode by using the kernel density estimation. Plots having the same shape mean a large amount of data obtained from the kernel density estimation of the same anomaly mode. Axes in FIG. 8B represent first through third main components (obtained by sparsifying sensor data obtained from three sensors).

Then, in step S26, the cause analyzing unit 34 generates the anomaly cause classifier from the generated data. Here, the cause analyzing unit 34 generates the anomaly cause classifier $p(C_p \mid x)$ from large amounts of data generated with respect to each of causes of anomalies to classify the cause. Here, $C_p$ represents the class of an anomaly, and p represents a label of the anomaly mode (for example, the fitting position misalignment x-direction anomaly is represented by p=1, the pin damage anomaly is represented by p=2). The algorithm of the anomaly cause classifier may be any algorithm used for classification. For example, a support vector machine (SVM) may be used. In this case, the Gaussian kernel can be used as a kernel.

When the process up to step S26 is finished as described above, the process of FIG. 5 ends. In the present embodiment, by the execution of the process of FIG. 5, a structural model applicable to the non-normal distribution is generated based on the data related to anomalies, and the anomaly cause classifier that estimates the anomaly mode from large amounts of data generated from the generated structured model is generated. Accordingly, the anomaly cause classifier that is able to handle the non-normal distribution and precisely estimate the anomaly mode is generated.

(Operation Phase)

Figure 6:
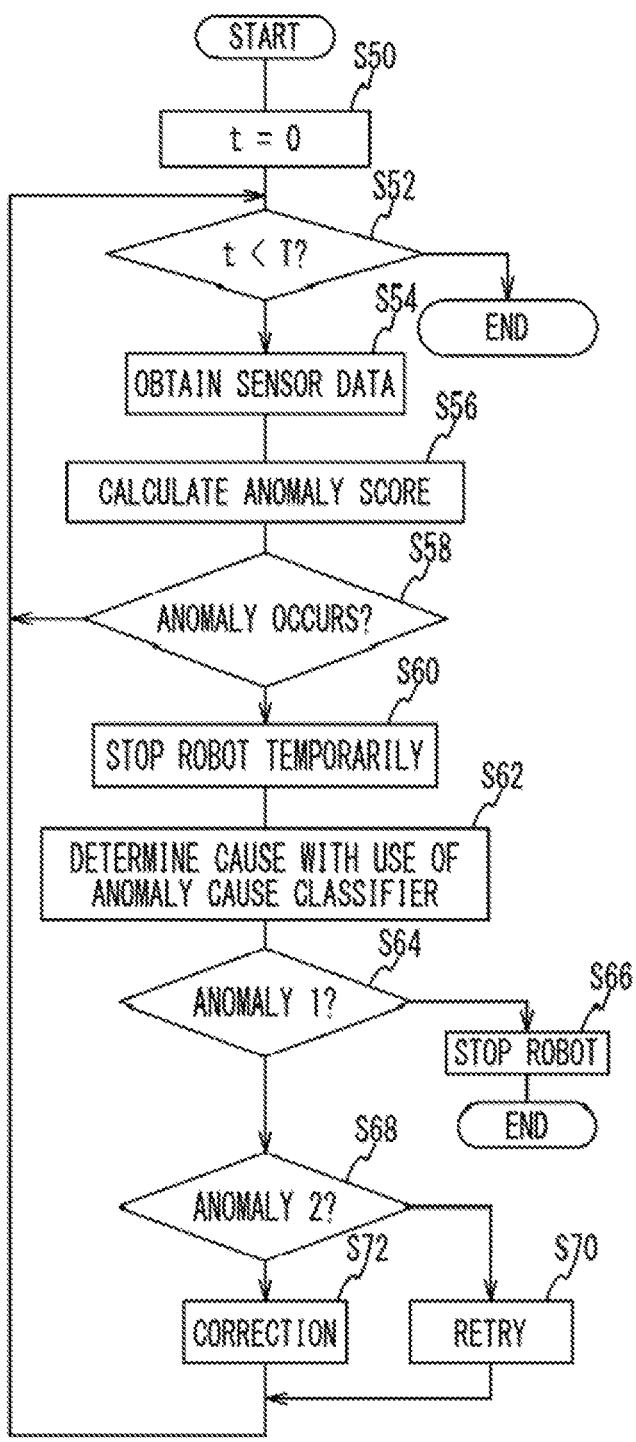
FIG. 6 is a flowchart of a process executed by the processing device in an operation phase.

FIG. 6 is a flowchart of a process executed by the processing device 10 in an operation phase.

It is assumed that the process of FIG. 5 is already executed before the execution of the process of FIG. 6. In the process of FIG. 6, in step S50, the anomaly determination unit 32 sets the time t from the commencement of a task at 0. The time t from the commencement of a task is updated with time when the process of FIG. 6 is started.

Then, in step S52, the anomaly determination unit 32 determines whether t is less than a task completion time T. When the determination in step S52 is No, i.e., when the time t from the commencement of the task becomes equal to or greater than the task completion time T (when the task is ended), the entire process of FIG. 6 is ended. On the other hand, when the determination in step S52 is Yes, the process moves to step S54.

Then, in step S54, the anomaly determination unit 32 obtains the sensor data $x_{jt}$. Here, j means the sensor number. Then, in step S56, the anomaly determination unit 32 calculates the anomaly score s with use of the above equation (1). As described above, in the present embodiment, use of the anomaly detection algorithm that outputs the anomaly score is a prerequisite. Thus, the anomaly score sit can be calculated with respect to each sensor or each sensor group.

Then, in step S58, the anomaly determination unit 32 determines whether an anomaly occurs with use of the anomaly detection classifier. In this case, the anomaly determination unit 32 uses the anomaly detection classifier generated in step S12 of FIG. 5, and determines that an anomaly occurs when the sensor data is out of the threshold range (the range sandwiched between the dashed lines in FIG. 2). When the determination in step S58 is No, i.e., when an anomaly does not occur, the process returns to step S52. However, when the determination is Yes, the process moves to step S60.

In step S60, the anomaly determination unit 32 stops the robot 22 temporarily.

Figure 7C:
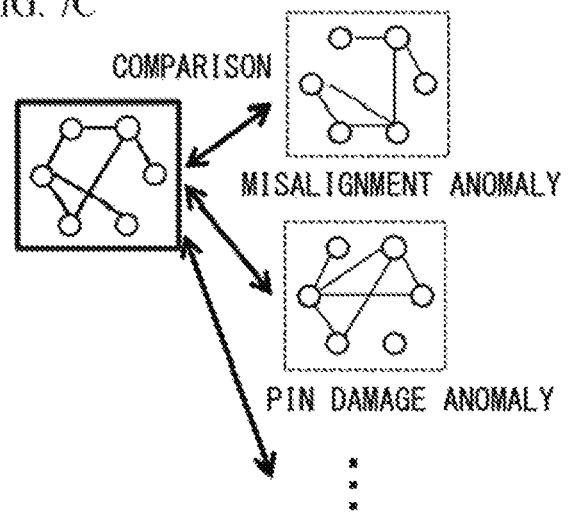

Then, in step S62, the cause analyzing unit 34 conducts the cause determination with use of the anomaly cause classifier. In this case, the cause analyzing unit 34 determines which anomaly occurs by substituting the anomaly scores $s_{jt}$ before and after the anomaly determination in the anomaly cause classifier. FIG. 7C schematically illustrates the contents of the process in step S62. In the present embodiment, as described above, each anomaly is classified as the "anomaly 1", which is an anomaly that requires the robot 22 to be stopped, the "anomaly 2", which is an anomaly that requires retry of the robot 22, or the "anomaly 3", which requires the correction of the motion of the robot 22. Thus, the cause analyzing unit 34 determines which one of the anomalies 1 to 3 the anomaly corresponds to, based on the determination result (the cause of the anomaly).

Here, in the present embodiment, the anomaly cause classifier used by the cause analyzing unit 34 is an anomaly cause classifier generated based on the sparsified sensor data i.e., the important data related to anomalies. In addition, the anomaly cause classifier used by the cause analyzing unit 34 is an anomaly cause classifier applicable to complex models that cannot be calculated using the maximum likelihood estimation method. Thus, the cause analyzing unit 34 is able to precisely analyze the cause of the anomaly by using the sensor data obtained at the timing when an anomaly was detected or the timing immediately after the anomaly was detected.

Then, in step S64, the cause analyzing unit 34 determines whether the determination result in step S62 is the anomaly 1. When the determination in step S64 is Yes, the process moves to step S66, the robot 22 is stopped, and the entire process of FIG. 6 is ended.

On the other hand, when the determination in step S64 is No, and the process moves to step S68, the cause analyzing unit 34 determines whether the anomaly is the anomaly 2. When the determination in step S68 is Yes, the process moves to step S70, and the cause analyzing unit 34 instructs the robot 22 to execute retry.

On the other hand, when the determination in step S68 is No, the anomaly is the anomaly 3. Thus, the cause analyzing unit 34 moves to step S72, and instructs the motion correction unit 36 to execute correction. The motion correction unit 36 corrects the motion of the robot 22 by a correction method corresponding to the cause of the anomaly.

After the process in step S70 or step S72 is conducted, the process returns to step S52, and the processes in and after step S52 are repeatedly executed. Accordingly, even when the robot 22 is immediately stopped when an anomaly occurs to the robot 22, the cause of the anomaly is precisely determined, and the measures (stoppage, retry, correction) suitable for the determined cause of the anomaly can be taken.

As clear from the description above, functions as an acquisition unit that obtains test data, an extraction unit that sparsifies the test data to extract data related to an anomaly, a conversion unit that converts the sparsified test data into structural data having a graph structure focusing on the analogous relationship between sensors, and a generating unit that generates an anomaly cause classifier are implemented by the cause analyzing unit 34.

As described in detail above, in the first embodiment, the cause analyzing unit 34 obtains the sensor data (test data) of the robot 22, and extracts the data related to an anomaly (sparsified sensor data) from the test data based on the threshold value used in detecting an anomaly. Then, the cause analyzing unit 34 converts the sparsified sensor data into structural data having a graph structure focusing on the analogous relationship between or among sensors, and generates an anomaly cause classifier with use of the converted structural data. Accordingly, in the present embodiment, the anomaly cause classifier used by the cause analyzing unit 34 is generated with use of the sparsified sensor data, and thereby, achieves an anomaly cause classifier applicable to complex models (non-parametric models) that cannot be calculated using the maximum likelihood estimation method. Thus, the cause analyzing unit 34 is able to precisely analyze the cause of an anomaly by using the sensor data obtained at the timing when the anomaly was detected or the timing immediately after the anomaly was detected. This allows the robot 22 to be stopped before a part (a component or the like) of the product produced by the robot 22 is damaged.

Figure 9A:
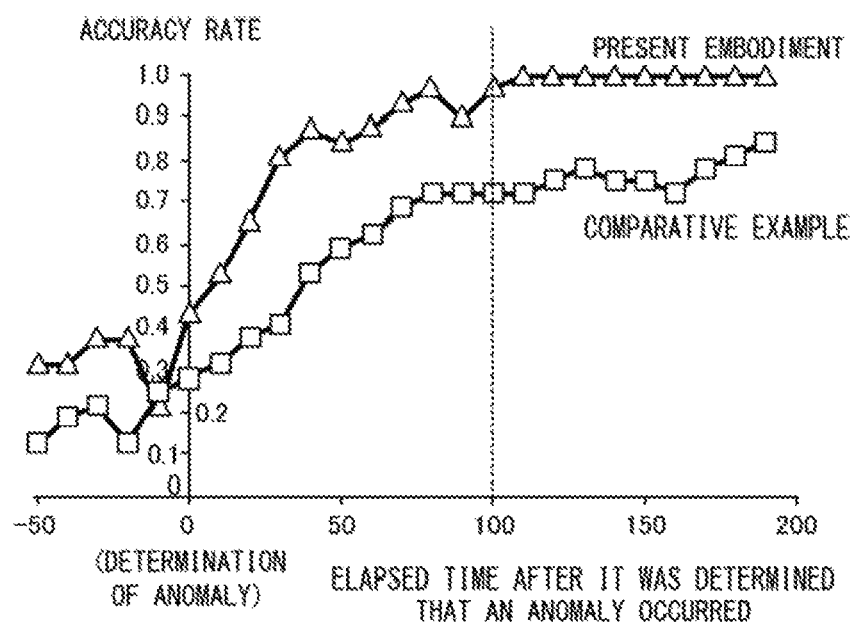
FIG. 9A is a graph for comparing the accuracy rate of the first embodiment with the accuracy rate of a comparative example.
Figure 9B:
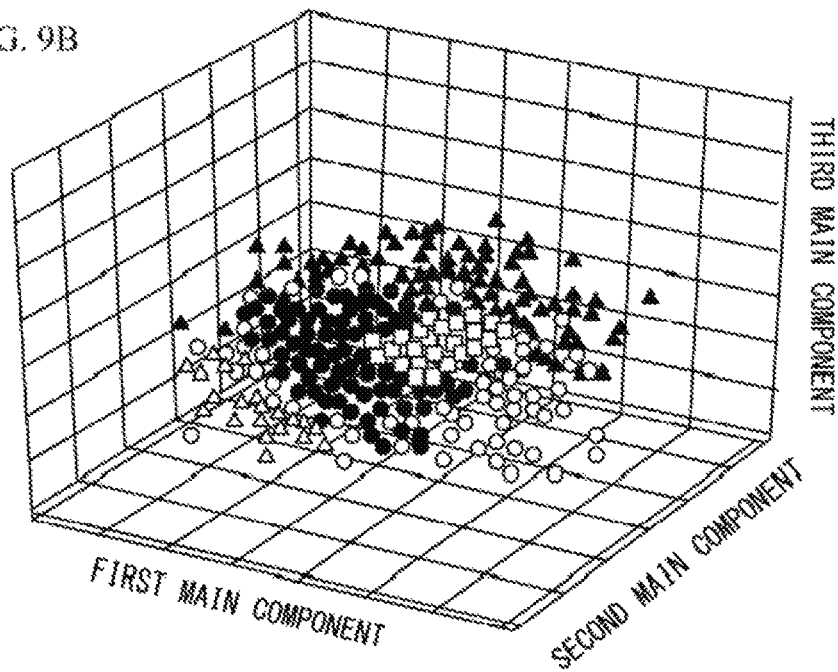
FIG. 9B illustrates large amounts of data generated from a sparsified model in the comparative example.

For example, if approximately 400 msec elapses after it is determined that an anomaly occurs, a part of the product may be damaged. In contrast, in the present embodiment, the cause is analyzed in short time (e.g., approximately 100 msec) after it is determined that an anomaly occurs. Thus, the cause is precisely analyzed without damaging a part of the product. For example, even when the sensor data in the state where a component was not damaged immediately after it was determined that an anomaly occurred (data 100 msec after it was determined that an anomaly occurred) is used, a high accuracy rate, 97% is obtained in the present embodiment (see FIG. 9A). The inventors analyzed anomalies using the technique that structures the dependent relationship of sensor groups with use of a Gaussian graphical model (comparative example). Large amounts of data generated from the model based on the sparsified sensor data are data illustrated in FIG. 9B in the comparative example. As clear from the comparison between FIG. 9B and FIG. 8B, in the comparative example (FIG. 9B), data of anomaly modes are mixed. However, in the present invention (FIG. 8B), data of anomaly modes are relatively separated from each other. In the comparative example, when the sensor data in the state where a component was not damaged immediately after it was determined that an anomaly occurred (data obtained 100 msec after it was determined that an anomaly occurred) is used, the accuracy rate is approximately 72% (see FIG. 9A). In the example of FIG. 9A, 162 data is used as the test data. The test data included 17 normal data, 5 pin flexions, 35 misalignments in the positive x-direction, 35 misalignments in the negative x-direction, 35 misalignments in the positive y-direction, and 35 misalignments in the negative y-direction.

In the present embodiment, the cause analyzing unit 34 sparsifies the test data by setting values of the sensor data included within the range defined by the threshold value (the normal range) at 0. This allows simple and appropriate sparsification, and enables to obtain only data related to anomalies.

In the present embodiment, the cause analyzing unit 34 conducts dimensional compression of the Gram matrix. This makes the eigenvalues only the eigenvalues greater than 0. Thus, excess calculation becomes unnecessary, the modeling becomes easier, and the performance in identifying the cause of the anomaly is thus enhanced.

Second Embodiment

Figure 10:
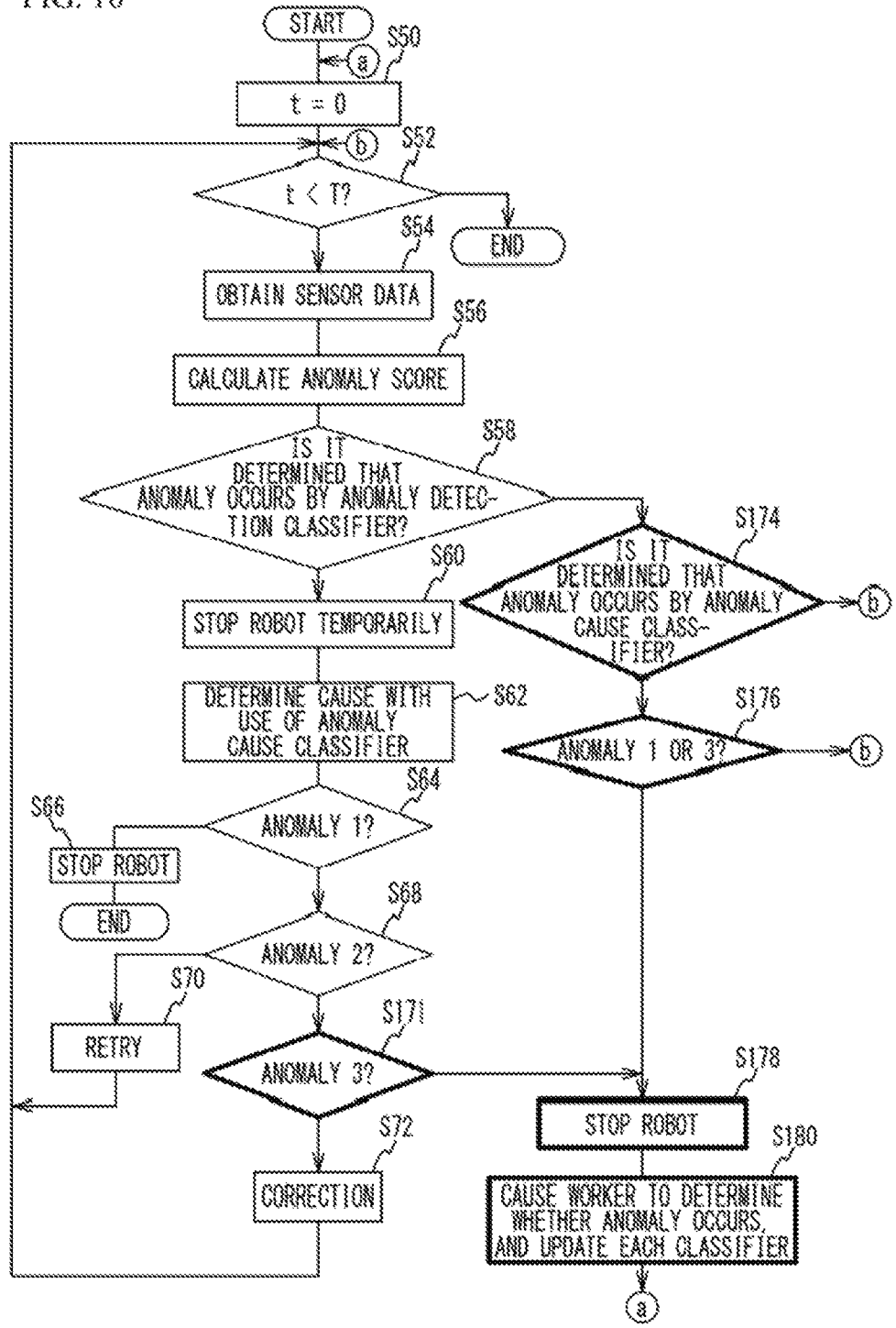
FIG. 10 is a flowchart of a process executed by the processing device in the operation phase in accordance with a second embodiment.

Next, a second embodiment will be described with reference to a flowchart of FIG. 10. The second embodiment changes a part of the process of FIG. 6 in the first embodiment to enhance the accuracy of the anomaly detection classifier. In the process of FIG. 10, the steps different from the steps of FIG. 6 are indicated by bold lines.

In the second embodiment, the process from step S50 to S70 are executed as in the first embodiment. However, the second embodiment differs from the first embodiment in that the process moves to step S174 when the determination in step S58 is No. In addition, the second embodiment differs from the first embodiment in that it is determined whether the anomaly is the "anomaly 3" in step S171 after step S68, the process moves to step S72 when the determination in step S171 is Yes, and the process moves to step S178 when the determination in step S171 is No (when it is determined that an anomaly does not occur).

In the process of FIG. 10, when the anomaly determination unit 32 determines that an anomaly does not occur with use of the anomaly detection classifier (858: No), but the cause analyzing unit 34 determines that an anomaly of some kind occurs with use of the anomaly cause classifier (S174: Yes) and determines that the anomaly is an anomaly that requires correction or stoppage as with the anomaly 1 or 3 (S176), the robot 22 is stopped temporarily (S178). The cause analyzing unit 34 performs output (display) for causing a worker to determine whether an anomaly occurs, and executes the process of updating (relearning) each classifier based on the results (when the worker determined that an anomaly occurred) (S180).

When the anomaly determination unit 32 determines that an anomaly occurs with use of the anomaly detection classifier (S58: Yes) but the cause analyzing unit 34 determines that an anomaly does not occur (S171: No) as a result of the cause determination with use of the anomaly cause classifier (S62), the robot 22 is stopped temporarily (S178). Then, the cause analyzing unit 34 performs output (display) for causing a worker to determine whether an anomaly occurs to make the worker determine whether an anomaly occurs, and executes the process of updating (relearning) each classifier based on the result (S180).

After step S180, the process moves to step S50.

In the present embodiment, the cause analyzing unit 34 functions as an output unit that performs output based on the determination result with use of the anomaly detection classifier and the determination result with use of the anomaly cause classifier.

As described above, in the second embodiment, the processing device 10 executes the process of FIG. 10 to check whether the result of the anomaly detection agrees with the result of the analysis of the cause of the anomaly, and when there is a contradiction, the processing device 10 causes a worker to determine whether an anomaly occurs. Then, the anomaly determination unit 32 relearns each classifier when the worker determined that an anomaly occurred. Accordingly, use of the classifier after relearning enhances the identification accuracy of the cause of the anomaly.

The first and second embodiments have described the detection of an anomaly and the determination of the cause of the anomaly for the production robot (the industrial robot), but do not intend to suggest any limitation. For example, the embodiments may be applied to the detection of an anomaly and the determination of the cause of the anomaly for robots other than the production robots, and may be applied to the detection of an anomaly and the determination of the cause of the anomaly for devices other than robots.

The above-described processing functions are implemented by a computer. In this case, a program in which processing details of the functions that a processing device (CPU) is to have are written are provided. The execution of the program by the computer allows the computer to implement the above described processing functions. The program in which the processing details are written can be stored in a storage medium (however, excluding carrier waves) capable of being read by a computer.

When the program is distributed, it may be sold in the form of a portable storage medium such as a DVD (Digital Versatile Disc) or a CD-ROM (Compact Disc Read Only Memory) storing the program. The program may be stored in a storage device of a server computer, and the program may be transferred from the server computer to another computer over a network.

A computer executing the program stores the program stored in a portable storage medium or transferred from a server computer in its own storage device. The computer then reads the program from its own storage device, and executes a process according to the program. The computer may directly read the program from a portable storage medium, and execute a process according to the program. Alternatively, the computer may successively execute a process, every time the program is transferred from a server computer, according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A determination device comprising:
a memory; and
a processor coupled to the memory and configured to:
obtain sensor data on motion of a device from a plurality of sensors,
extract, from the sensor data, time-series data related to an anomaly based on a threshold value used in detecting the anomaly with use of the sensor data,
determine an analogous relationship between or among the plurality of sensors from the time-series data related to the anomaly and convert the time-series data related to the anomaly into structural data having a graph structure in which the analogous relationship is represented by a line and the plurality of sensors are represented by dots, and
generate, from the structural data, data for each cause of the anomaly using kernel density estimation, and generate a classifier that identifies a cause of the anomaly from the data generated for each cause of the anomaly.

2. The determination device according to claim 1, wherein the processor is configured to set a value of sensor data within a normal range defined by the threshold value among the sensor data at 0.

3. The determination device according to claim 1, wherein the structural data is a Gram matrix.

4. The determination device according to claim 3, wherein the processor is configured to conduct dimensional compression of the structural data.

5. The determination device according to claim 1, wherein the processor is further configured to:
detect the anomaly with use of the threshold value,
identify a cause of the anomaly with use of the classifier, and
perform output based on a result of detection of the anomaly and an identification result of the cause of the anomaly.

6. A determination method implemented by a computer, comprising:
obtaining sensor data on motion of a device from a plurality of sensors;
extracting time-series data related to an anomaly from the sensor data based on a threshold value used in detecting the anomaly with use of the sensor data;
determining an analogous relationship between or among the plurality of sensors from the time-series data related to the anomaly and converting the time-series data related to the anomaly into structural data having a graph structure in which the analogous relationship is represented by a line and the plurality of sensors are represented by dots; and
generating, from the structural data, data for each cause of the anomaly using kernel density estimation, and generating a classifier that identifies a cause of the anomaly from the data generated for each cause of the anomaly.

7. The determination method according to claim 6, wherein the extracting includes setting a value of sensor data within a normal range defined by the threshold value among the sensor data at 0.

8. The determination method according to claim 6, wherein the structural data is a Gram matrix.

9. The determination method according to claim 8, wherein the generating includes conducting dimensional compression of the structural data.

10. The determination method according to claim 6, further comprising:
detecting the anomaly with use of the threshold value;
identifying a cause of the anomaly with use of the classifier; and performing output based on a result of the detecting of the anomaly and an identification result of the cause of the anomaly.

11. A non-transitory computer-readable storage medium storing a determination program causing a computer to execute a process, the process comprising:
    obtaining sensor data on motion of a device from a plurality of sensors;
    extracting time-series data related to an anomaly from the sensor data based on a threshold value used in detecting the anomaly with use of the sensor data;
    determining an analogous relationship between or among the plurality of sensors from the time-series data related to the anomaly and converting the time-series data related to the anomaly into structural data having a graph structure in which the analogous relationship is represented by a line and the plurality of sensors are represented by dots; and
    generating, from the structural data, data for each cause of the anomaly using kernel density estimation and generating a classifier that identifies a cause of the anomaly from the data generated for each cause of the anomaly.

12. The non-transitory computer-readable storage medium according to claim 11, wherein the extracting includes setting a value of sensor data within a normal range defined by the threshold value among the sensor data at 0.

13. The non-transitory computer-readable storage medium according to claim 11, wherein the structural data is a Gram matrix.

14. The non-transitory computer-readable storage medium according to claim 13, wherein the generating includes conducting dimensional compression of the structural data.

15. The non-transitory computer-readable storage medium according to claim 11, the process further comprising:
    detecting the anomaly with use of the threshold value;
    identifying a cause of the anomaly with use of the classifier; and
    performing output based on a result of the detecting of the anomaly and an identification result of the cause of the anomaly.

* * * * *